UNITED STATES PATENT OFFICE.

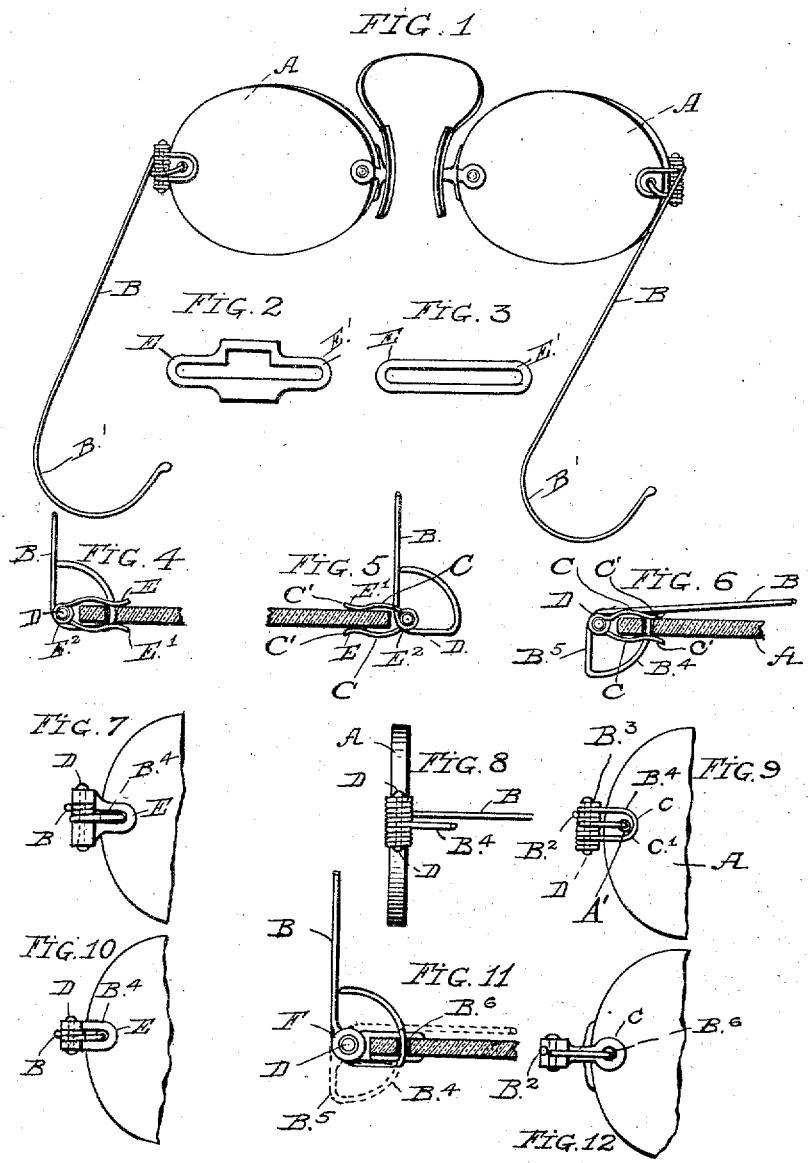

LEWIS H. BROOME, OF JERSEY CITY, NEW JERSEY.

TEMPLE FOR EYEGLASSES.

962,549.  Specification of Letters Patent. Patented June 28, 1910.

Application filed September 18, 1909. Serial No. 518,409.

*To all whom it may concern:*

Be it known that I, LEWIS H. BROOME, a citizen of the United States, and a resident of Jersey City, in the county of Hudson and State of New Jersey, have invented certain new and useful Improvements in Temples for Eyeglasses, of which the following is a specification.

The present invention relates to eyeglasses, spectacles, and similar devices; and its object is to provide a new and improved temple with a fastening attached and a spring clamp, which combined, form a simple and durable article, cheap to manufacture, and so arranged that it may be quickly and securely attached to the lens or like article and cannot come off without the user so desiring.

The invention consists of novel features and parts and combinations of the same as will be fully described hereinafter and clearly referred to in the claims.

Figure 1 is a perspective view of a pair of eyeglasses, with one form of improved device applied. Fig. 2 is a stamping which is afterward formed as shown on Fig. 7. Fig. 3 is a blank as shown on Fig. 10. Fig. 4 is a sectional, side view of the attachment as shown by Figs. 7 and 10. Fig. 5 is a view of the attachment shown as applied to a lens without an opening in the lens. Fig. 6 is a sectional view of the improvement with the temple shown folded down upon the lens. Fig. 7 is another form made from any metal and from the blank of Fig. 2. Fig. 8 is an end view of the improvement as shown in Fig. 1. Fig. 9 is a front detail view similar to Fig. 1. Fig. 10 is still another form as made from the blank of Fig. 3. Fig. 11 is a sectional view of a form of my improvement as applied to lenses having clamping ears by omitting the screw, the fastening passing through the hole in the lens and ears and secured to the lens clamp. Fig. 12 is an elevation view of the form shown in Fig. 11.

My construction includes three pieces in each case, namely, a temple having an eye formed at one end, and a hook made integral and extending in curved form to permit the hook to pass through a hole in the lens; a clamping member also provided with an eye and formed either from a piece of sheet metal or spring wire, to present spring clamping portions to clamp on to the opposite sides of the lens; and a pin which passes through the eyes of the two members and serves as a pivot connection 9 for said members.

My device may be used on either side of the glasses, that is, on either the right or left side of the face, the clamping member being adapted for use in this manner, and I may also use the clamps on lenses that are not provided with holes therethrough, if desired.

Referring to the drawings, Figs. 8 and 9, illustrate a simple form of my device made entirely from spring wire. A indicates a lens, having a small hole A' near its edge. B, indicates the temple portion, in which the ear hook portion B' has been broken off, the broken end of the wire being indicated by B², and the eye is formed by bending the wire into helical form at B³ and the end of said wire being formed in the curved hook B⁴, which is formed by extending the wire B, after the eye is formed therein, at a right-angle to the axis of said wire B as shown in Fig. 6 at B⁵, and then bending the wire in the arc of a circle as illustrated at B⁴.

Figs. 5 and 6, illustrate very clearly, the general form of the temple portion of my device. The clamp portion is indicated by C and is made by bending a separate piece of wire to form U shaped ends C'. and eyes which aline with the eye in the temple portion and through which extends a pin D, on which the clamp portion and temple portion may swing relatively to each other.

The only difference in construction between that shown in Figs. 8 and 9, and that shown in Figs. 4, 5 and 6, is, that the clamp portion illustrated in Figs. 4 and 5 and 6 is stamped from sheet metal whereas in the other views mentioned the clamp portion is made of wire.

It will be noticed that in Figs. 6 the end of the hook B⁴ abuts the portion B, after passing through the hole in the lens. This construction prevents the lens from being withdrawn from between the clamps until the hook is forced downward out of said hole, the spring of the wire serving to allow of this function.

In Figs. 4, 5 and 6, a special feature of construction is disclosed in the clamping member, and consists in forming said member so that when disconnected from the lens, the clamping ends contact with each other and are separated a distance from each other just back of where the contact is effected. A distance apart greater than the thickness of the lens, so that when the faces of the clamps are separated and grip the lens as shown, the spring action of the metal will cause the lens to be firmly gripped at a distance from its edge, and this construction also permits lenses of varying thickness to be readily gripped, as will be easily understood.

When a lens is to be gripped that is not provided with a hole near its edge, my clamp is swung on its pivot a one half revolution relative to the temple, as illustrated in Fig. 5, the hook then projecting outward as shown, and the lens is then held by friction only.

When the stampings as shown in Figs. 2 and 3 are used they are bent in such a manner that the two outer edges E and E' will be brought opposite to each other and formed as illustrated in Figs. 4 and 5 to present spring formed clamps having an eye formed at E². A pivot D is passed through said eye, and through the eye in the temple to hold them together as will be readily understood.

In Figs. 11 and 12, I have illustrated further modification in which I show that the temple may be provided with a boss F which boss is provided with an eye through which the pivot D is passed to secure the clamp member to the temple, and in which the short end B⁵ is formed in a straight line with the main portion of the temple at B and the hook portion is formed semi-circular as shown, and the clamping member is formed of pressed or cast metal and similar in form to this portion of a temple as usually made for glasses of this kind and usually held to the lens by a simple screw which passes through the hole in the lens and is screwed into the clamping member C. I am able to use this portion of the temple as heretofore made and insert in place of the straight temple rod, my present temple B with the hook portion B⁴ which hook portion is passed through the opening B⁶ and the holes in the clamp C. By this construction I am able to utilize the present and old form of temple clamp.

It is thought that this invention is of such a simple character that further description is unnecessary to a perfect understanding of its construction and use.

Having thus described my invention what I claim as new and desire to secure by Letters Patent is:

1. A device of the character described comprising a temple having a clamping member adapted to engage the surface of a lens, and having a hook adapted to engage a hole in a lens for the purpose set forth.

2. A device of the character described comprising a temple having a hook adapted to engage a hole in a lens as set forth, a clamping member, and a pin to hold said temple and clamping member together.

3. A device of the character described comprising a temple having a hook adapted to engage a hole in a lens as set forth, a clamping member and a pin to hold said clamping member in pivotal relation to said temple.

4. A device of the character described comprising a temple having a hook adapted to project through a hole in a lens as set forth, a clamping member presenting clamps the outer ends of which are adapted to contact and being curved to permit the edge of the lens to rest between said clamping members without contact with the face of said lens except where they end substantially as set forth.

5. A device of the character described comprising a temple with one end thereof bent at an angle to the axis of said temple and terminating in a curved hook; and a clamping member connected to said temple at the center of the radius of said hook.

6. A device of the character described comprising a temple having a hook adapted to engage with the lens, and a clamping element pivoted to said temple and adapted to swing about said pivot through an arc of 90 degrees.

7. A device of the character described comprising a temple having one end bent at a right angle to the line of the major portion of the temple and a curved portion which extends to the body portion of the temple and a clamping element pivoted to said temple and having an opening through the clamps through which said curved portion of the temple may project substantially as set forth.

Signed at New York in the county of New York and State of New York this 16th day of September, A. D. 1909.

LEWIS H. BROOME.

Witnesses:
FRANK M. ASHLEY,
HARRY A. WILKES.